United States Patent [19]

Hanks

[11] 4,028,821

[45] June 14, 1977

[54] APPARATUS FOR DREDGING FROM THE STERN OF MARINE VESSELS

[76] Inventor: Fletcher Hanks, Hanks Seafood Co., Inc., P.O. Box 70, Easton, Md. 21601

[22] Filed: July 1, 1975

[21] Appl. No.: 592,224

Related U.S. Application Data

[63] Continuation-in-part of Ser. No. 442,604, Feb. 14, 1974, abandoned.

[52] U.S. Cl. .................................... 37/55; 37/119; 43/8; 43/102; 254/137
[51] Int. Cl.² ........................................... E02F 5/00
[58] Field of Search ............... 37/55, 119, 71, 115, 37/135, 136; 43/6.5, 8, 100, 102, 4; 254/137, 138

[56] References Cited

UNITED STATES PATENTS

| | | | |
|---|---|---|---|
| 1,066,683 | 7/1913 | Truesdell | 37/136 X |
| 1,168,293 | 1/1916 | Emmons | 37/119 |
| 2,414,055 | 1/1947 | Miller | 43/6.5 X |
| 2,648,918 | 8/1953 | Mazzella | 37/55 |
| 3,084,309 | 4/1963 | Wiegardt, Jr. | 37/119 |
| 3,257,008 | 6/1966 | Luketa | 43/8 X |
| 3,367,048 | 2/1968 | Doughty | 37/55 |
| 3,465,901 | 9/1969 | Grabowski | 37/55 X |

Primary Examiner—E. H. Eickholt

[57] ABSTRACT

A dredge for operation from the stern of marine vessels and of the type having runners which enable it to be moved along a ramp at the stern of a marine vessel is provided with structure for preventing its twisting and misalignment of the dredge as it passes through the wake of the propeller or a large wave, and also with a pivotally mounted door which will snap into a latched (closed) position by impact when empty and permitted to fall freely from above and into contact with the water adjacent the stern of the vessel, and which will be automatically released as the dredge with door closed and contents intact is raised onto and slidably moved along the ramp toward the bow of the vessel and the discharge station.

9 Claims, 7 Drawing Figures.

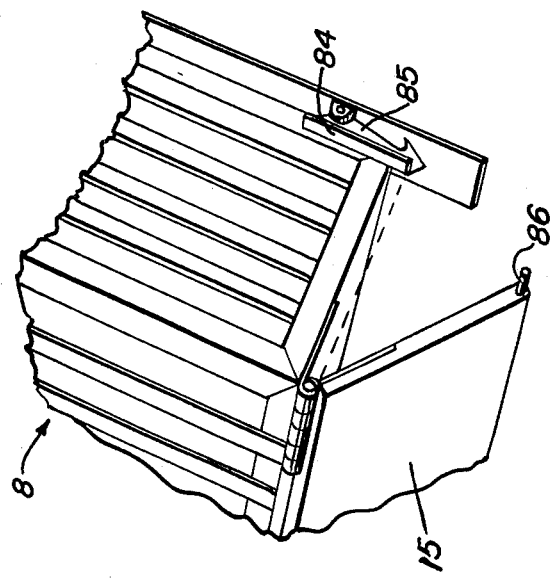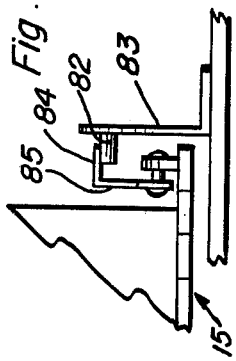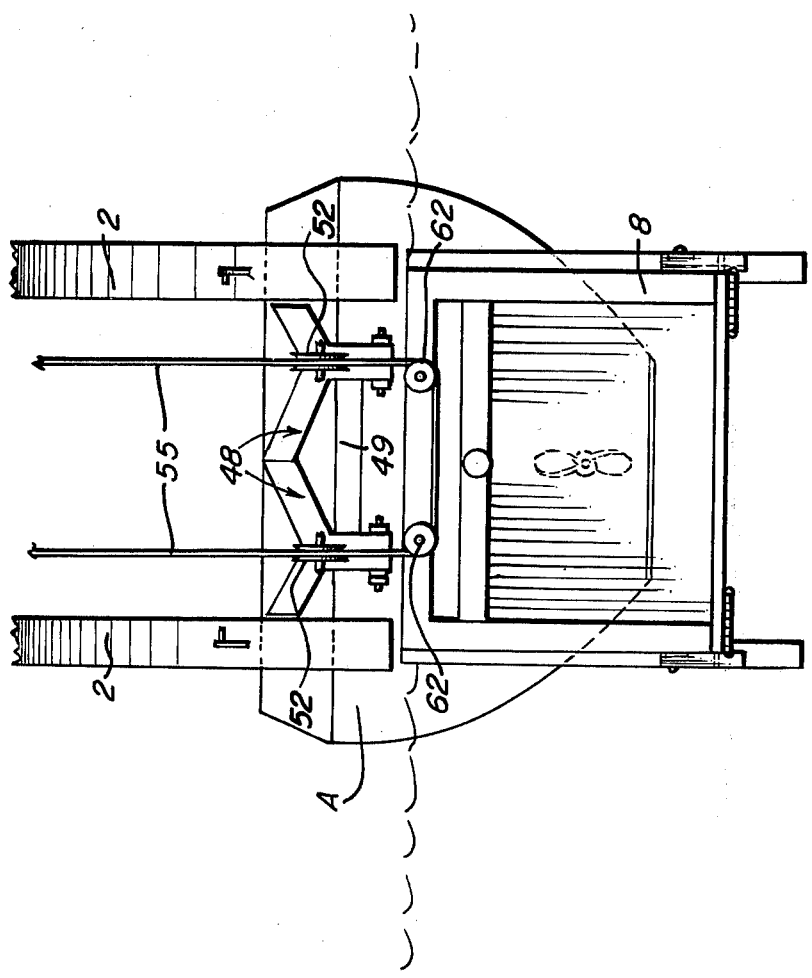

APPARATUS FOR DREDGING FROM THE STERN OF MARINE VESSELS

The present invention is a continuation-in-part of my presently pending application Ser. No. 442,604, filed Feb. 14, 1974 entitled "Apparatus For Dredging From The Stern of Marine Vessels", now abandoned.

This invention relates to dredges for operation from the stern of marine vessels of well known design which though quite heavily constructed are characterized by having a tendency to twist as they pass through the wake of the propeller, or when they encounter a large-size wave. This prevents the parallel runners which are disposed on the bottom of the heavy dredge from properly lining-up with the ramp which is at the stern of the vessel and which extends upwardly and forwardly of the vessel; thus causing damage to the stern of the vessel and the rudder, as well as the loss of the contents of the loaded dredge (clams, etc.) as it is lowered from hoisting position and the waves flush the contents out of the front or forward edge of the dredge.

Dredges of the type referred to hereinbefore are most frequently in the form of a rectangularly-shaped or box-like cage with a transversely extending dredging lip along its forward bottom edge; and with a rearwardly and transversely disposed gate pivotally mounted from its rearward upper end.

Another problem with clam dredges of the type described is that the pivotally mounted door or gate which must be rugged and is necessary heavy and requires the services of at least one member of the crew of the vessel, and sometimes two, to release it from closed position when the container portion of the dredging instrumentality is about to be emptied; and to close and latch the door preparatory to making another dredging operation after the contents of the dredge have been removed.

It is among the objects of the present invention to provide a dredging instrumentality of the type which carries parallel runners on its bottom and operates from the stern of a marine vessel, with novel means for preventing its misalignment as it is being lifted after a dredging operation, and preparatory to and while it is being moved along its ramp.

Still another object is the attainment of the foregoing advantages with equipment which is not only efficient in operation but which is relatively inexpensive and simple and easy to install on marine vessels, and particularly stern-operated clam dredges which are already in operation.

The foregoing and other objects and advantages will become more readily understood from the following description and annexed drawings wherein like reference characters designate like parts.

In said drawings:

FIG. 1 is a fragmentary side elevational view of a portion of the stern of a marine vessel which is widely used in the operation of stern-operated clam dredging instrumentalities, and illustrating on the vessel of the prior art, a conventional longitudinally disposed forwardly inclined ramp, the rearmost portion of the cable handling apparatus, and the clam dredging instrumentality itself, the latter being shown as occupying a vertical position in the water immediately astern the rudder of the conventional marine vessel.

FIG. 2 is a fragmented plan view of the showing of FIG. 1 and illustrating the cable handling equipment which is conventionally used for elevating the clam dredging instrumentality and moving it along the inclined ramp into discharge position while on the ramp.

FIG. 3 is a plan view which illustrates a part of the cable handling equipment of the invention that prevents the occurrence of the twisting of the clam dredging instrumentality, as earlier described, in such manner that its bottom runners are out of alignment with the conventional longitudinally extending forwardly inclined ramp at the stern of the vessel from which the dredging and emptying operations are to be conducted.

FIG. 4 is a composite view or angular exposure taken from above in partial plan and also in partial rear elevation, which is intended to illustrate the remainder of the cable handling equipment of the invention.

FIG. 5 is a perspective or isometric view of a clam dredging instrumentality which pursuant to the teachings of the invention is provided with a pivotally mounted door or gate is capable of automatic opening or release operation to discharge the contents while it is on the inclined ramp, said door or gate being also susceptible to, and being closed and latched by impact with the water adjacent the stern of the vessel when it is permitted to freely fall from the latter on its way to another dredging step.

FIG. 6 is a fragmentary elevational view which illustrates a suitable latching member and release mechanism for the pivotally mounted door at the stern of the clam dredge.

Referring more particularly to the drawings, the letter A generally designates a trawler of the type widely used in the mid-Atlantic states for offshore dredging of clams, etc. and wherein the dredge itself, with retrieving line etc., is released into the ocean or large body of water from the lower end of a forwardly inclined ramp B which is mounted at the stern of the trawler, with its lowermost end in a considerably elevated position whereby, upon quick release the box or cage of the dredging instrumentality, whereby a box or cage falling freely therefrom will contact the water immediately therebelow with a high degree of impact.

The floor of the ramp comprises a pair of forwardly extending, and substantially spaced, parallel runways 2, the same being provided with any suitable friction reducing means and with suitable guide means preventing the overtravel of the runners of the dredging instrumentality — all of which devices are entirely conventional are not claimed herein — and accordingly are not believed such as to require specific illustration along either side of the runways.

Figure 1:
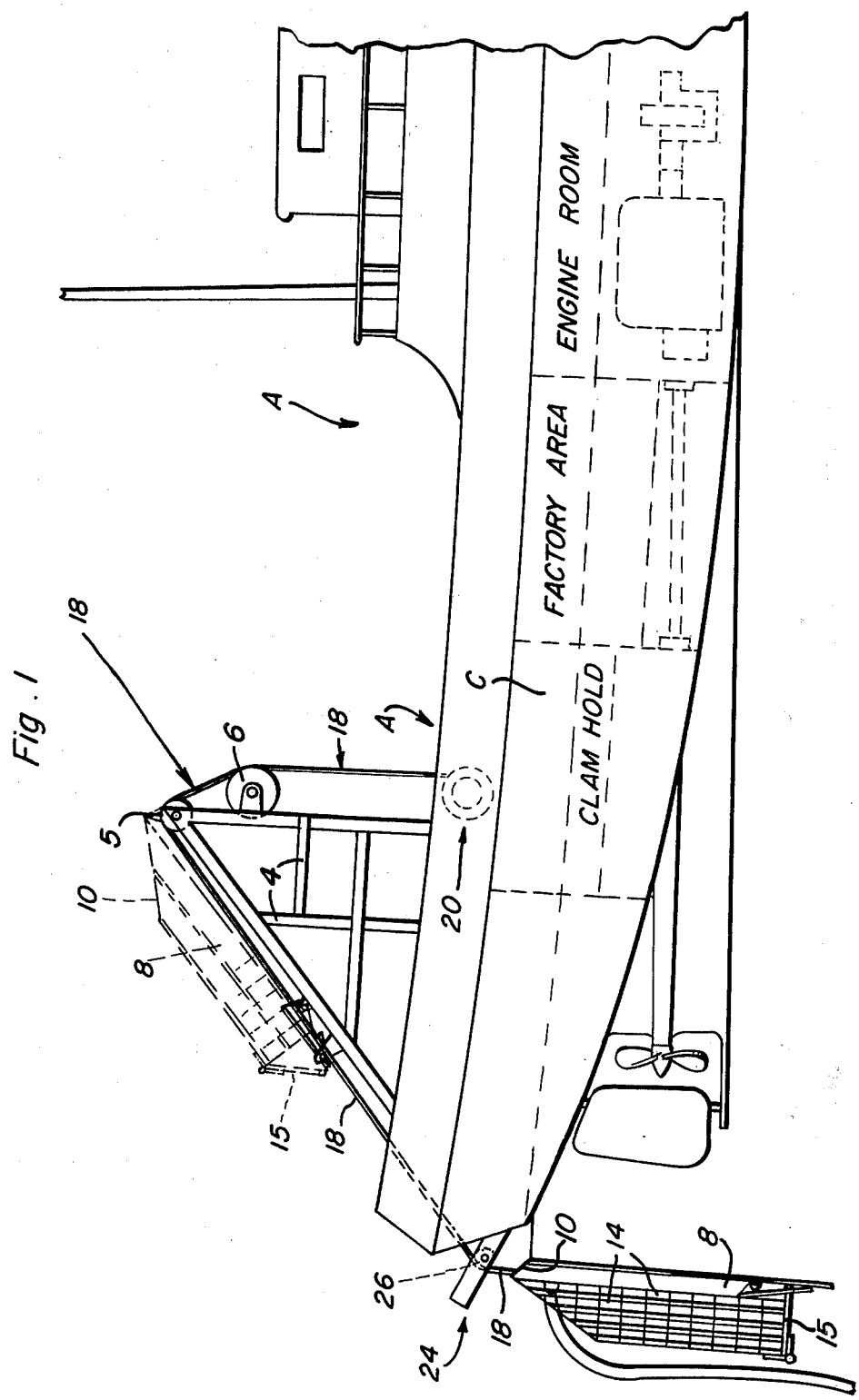

The ramp B is provided with suitable scaffolding or bracing 4; (FIG. 1) and at its top there is a cable-receiving sheave 5 which is in alignment with a lower, and larger, cable-receiving drum 6 which conveniently may be carried by the bracing.

The clam dredge itself comprises a generally rectangular body which may be of entirely conventional design. One familiar type is made-up of a box-like frame 8 (FIG. 1) having an upturned portion 10 at its forward end and a swinging gate or door 15 at its rear end which extends downwardly from an upper pivotal mounting.

In customary fashion the bottom of the box-like frame 8 is provided along its longitudinal edges with a pair of longitudinally extending parallel runners as earlier referred to which ride along the bottom or bed of the waterway during the dreding operation, and when raised from the waterway onto the forwardly inclined ramp B make contact with the aforementioned parallel runways 2 on said ramp.

The bottom of the box-like frame 8 of the dredging instrumentality is, of course, provided with the usual scoop which is disposed between the forward ends of the spaced parallel runners to scoop up clams etc. as the clam dredge moves along the bottom of the waterway.

Usually, there is a transversely extending manifold disposed forwardly of the aforementioned scoop and parallel with respect to the leading edge of the latter; and a water hose is connected to the manifold to provide water under pressure to jets on the manifold which assist in dislodging clams etc.

Such a scoop and water dispensing manifold which extend transversely of the dredge are disclosed in numerous patents, including my U.S. Pat. No. 2,672,700, dated Mar. 23, 1954, and as such form no part of the present invention. Accordingly, they are neither shown in the drawings nor more specifically described hereinafter.

The sides and top of the box-like frame 8, and the rearwardly disposed door or gate 15 may each comprise a series of parallel and closely spaced steel strips 14 which permit the flow of water, sand, mud shells and small stones, etc. from the interior of the clam dredge while permitting the retention of the clams therewithin.

A cable 18 is attached to the center of the front edge of the clam dredge and is trained over the sheave 5 on the ramp and collected onto, and payed from, a winch 20 which may be disposed on the deck of and secured to the vessel A at a suitable point which is below the sheave 6.

Figure 2:
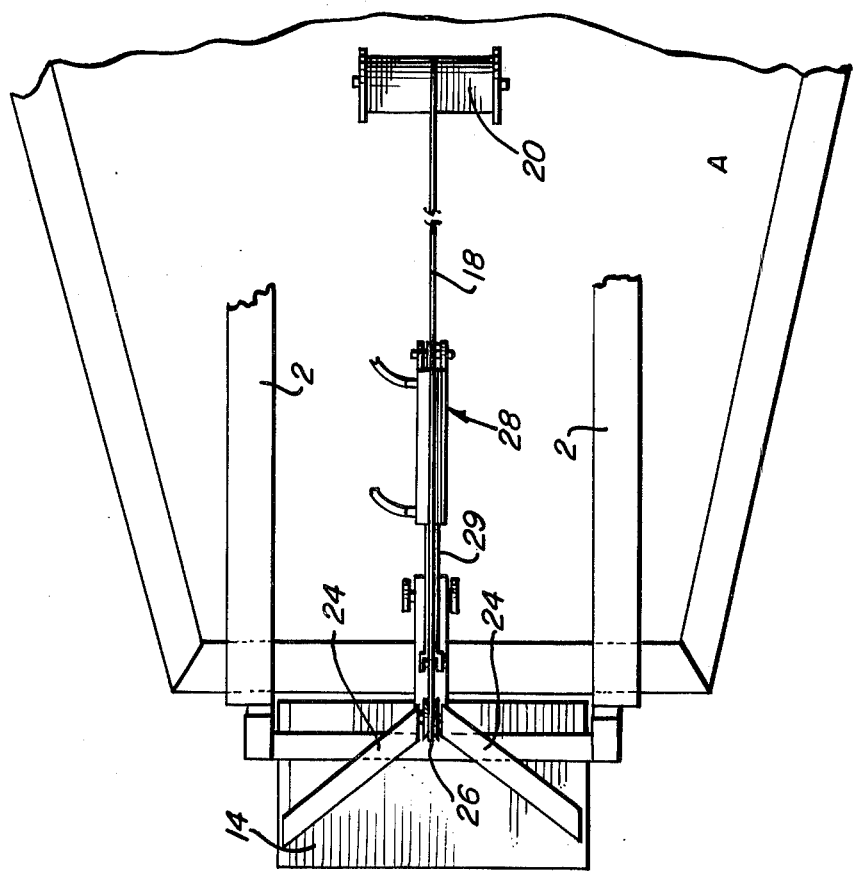
Figure 7:
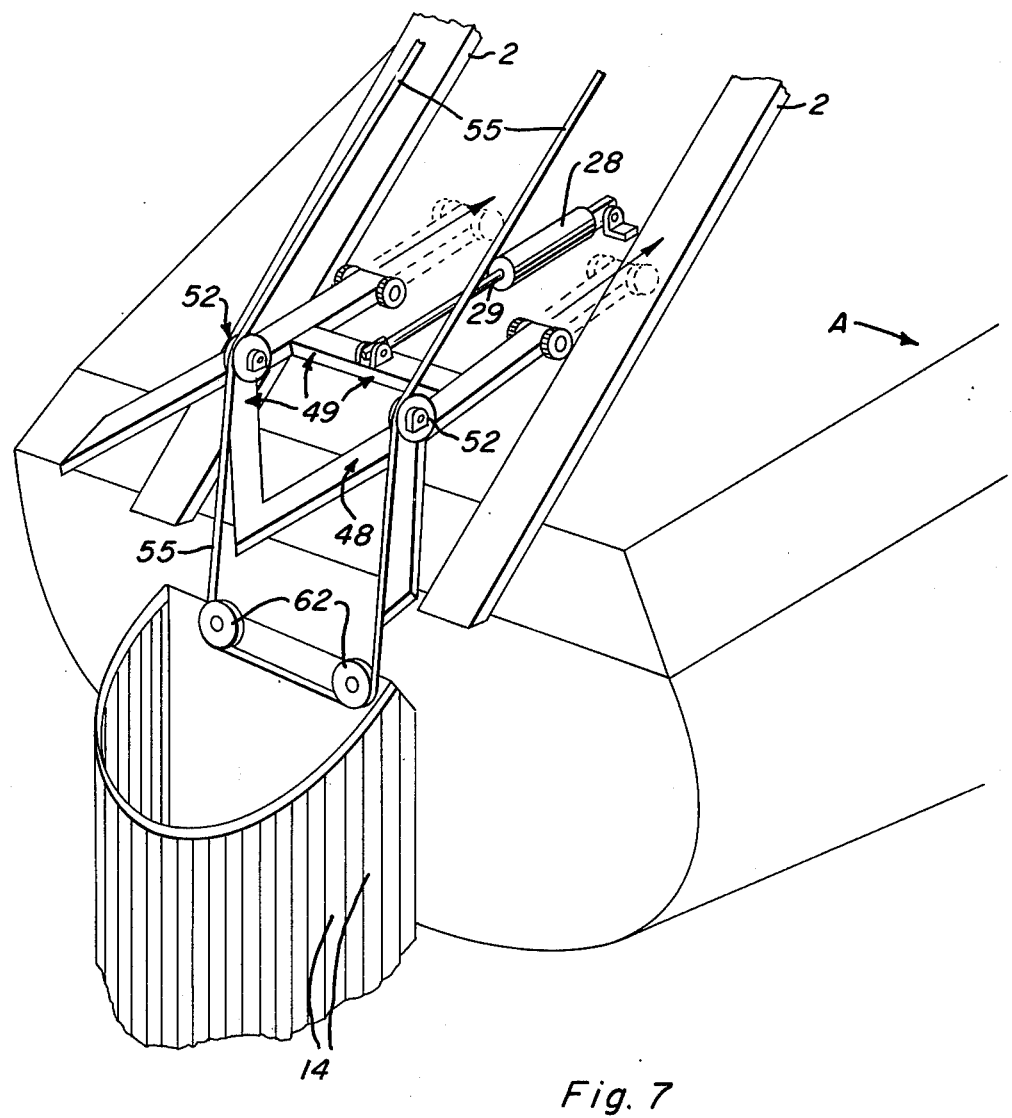
FIG. 7 is a perspective view taken from the stern of the vessel.

Prior to the present invention, and as shown in FIG. 2, it has been customary to assist the upward movement of the clam dredge 8 onto the forwardly inclined ramp B by means of a rearwardly inclined but generally horizontally disposed reciprocably mounted Y-shaped member 24 having its diverging ends rearwardly disposed with respect to the vessel.

Disposed on the upper surface of the Y-shaped member 24 at the junction of its diverging and rearwardly extending ends is a sheave 26 which makes contact with the cable 18 as it moves upwardly to and then downwardly from the grooved pulley 5 at the top of the ramp B.

Referring still to the prior art is a horizontally disposed fluid cylinder 28 is mounted on the vessel in alignment with the aforementioned sheave 26, and the outer end of the rod 29 of the piston within the fluid cylinder 28 is connected to the forwardly extending end of the rearwardly inclined Y-shaped member 24.

By suitably operating the horizontally disposed fluid cylinder 28 the rearwardly inclined Y-shaped member 24 may be moved sternwise or backwardly of the dredging vessel to permit the sheave 26 to elevate and move the cable 18 backwardly from the stern of the vessel to permit the clam dredge 8 to clear the stern and be moved upwardly onto the lower end of the ramp B; after which the rearwardly Y-shaped member 24 is retracted so as not to be in the way of the clam dredge in its upward movement onto the ramp.

This prior art arrangement of Y-shaped member 24 and fluid cylinder 28, as described hereinbefore, while at times useful, has the disadvantage of permitting the occasional twisting of the loaded clam dredge in its upward movement due to the wake of the vessel or heavy wave action; with consequent damage to the rudder, propeller and stern of the vessel.

As earlier mentioned, the present invention obviates this twisting problem by employing an improved combination of instrumentalities which assures correct alignment of a loaded clam dredge with respect to the longitudinally extending forwardly inclined unloading ramp at all times.

Figure 3:
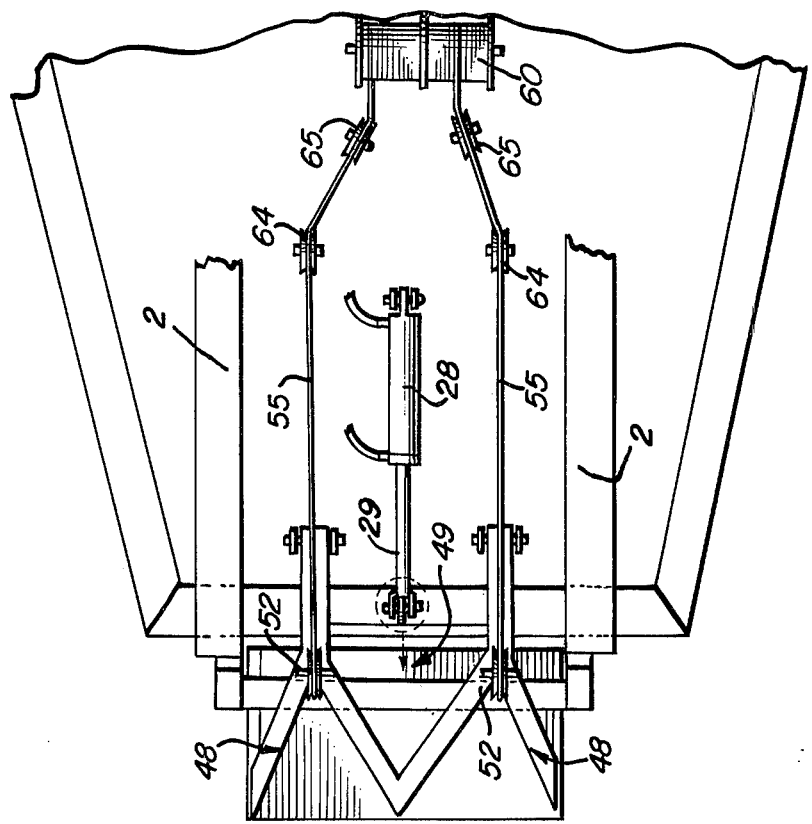

Referring to FIG. 3, the apparatus of the present invention comprises a pair of identical and generally horizontally disposed and rearwardly inclined reciprocably mounted Y-shaped members 48 assembled in parallelism and rigidly connected together by a sturdy transverse member 49.

These rearwardly inclined reciprocable twin Y-shaped members 48 are moved forwardly and rearwardly with respect to the vessel by a fluid cylinder 28 as in the case of the earlier described prior art apparatus.

Each of these rearwardly inclined reciprocably mounted and rigidly connected parallel Y-shaped members 48 carries a sheave 52 on its upper surface at the junction of its diverging ends, and these sheaves receive a portion of a cable 55 which has its ends secured to a winch 60.

The loop between the ends of the cable 55 is led around a pair of spaced parallel sheaves 62 at the forward corners of the dredging end of a clam dredge 8, and those portions of the cable 55 which pass between the sheaves 62 and the winch 60 are guided by parallel pairs of blocks 64 and 65 which are mounted on the ramp B of the vessel.

The distance between the cable passing through the pair of sheaves 62 is approximately that of the distance between the pair of sheaves 52 on the twin Y-shaped members 48.

Due to the arrangement of the pair of sheaves 52 on the twin Y-shaped members 48, the twin, spaced parallel sheaves 62 on the forward end of the clam dredge 8, and the other elements associated with the cable 55, the objectionable twisting earlier referred to is eliminated.

It will be understood that if desired a pair of winches (not shown in the drawings) may be substituted for the single winch 60; in which case each of the parallel cables 55 would be reeled onto and payed-off from a separate winch.

It is not necessary to have the twin spaced parallel sheaves 62 in order to maintain the level of the dredge while it is entering the ramp B, provided the cables on the winch (or winches track) properly so that both ends of the cable 55 are taken in at approximately the same rate.

In this case, the cable 55 is attached directly to the leading end of the dredge at points that will line up the dredge with the ramp B and the pair of sheaves 52 on the twin Y-shaped members 48.

Referring to FIGS. 5 and 6, another feature of the invention involves a biased latch mechanism which in part provides for the automatic opening and closing of the rear door or gate 15 of the clam dredge which is mounted for swinging movement from above.

Just the weight of the latch can be used to cause it to be properly biased and to perform properly. However, the latch may be spring-biased if desired.

This latch mechanism may be entirely conventional and as such forms no part of the present invention. Since one of these latch mechanisms is provided for each of the bottom corners of the swinging door or gate, description of one should suffice for both.

As shown, this latch mechanism comprises a rearwardly extending biased latch 84-85 which is mounted for pivotal movement in a vertical plane on each side of the clam dredge immediately above the runner thereof and slightly forwardly of the swinging door 15, the latter carrying an outwardly and horizontally extending boss 86 for engagement by the notch on the underside of the latching element 85 when the rear door is in closed position.

As viewed in FIGS. 5 and 6, the direction of the spring biasing influences the arm 85 downwardly and into latching position.

Mounted on the adjacent surface 2 of the ramp which is engaged by the corresponding runner of the clam dredge is an upwardly extending tripper plate 83; and this tripper plate 83 is provided with an inwardly extending round boss 82.

The underside of the horizontal portion 84 of the latch is engaged by the round boss 82 at a point on the ramp where it is desired to release the swinging door 15; thus causing the latch mechanism 84-85 to swing upwardly and disengage from the adjacent boss 86 on said door.

When the clam dredge has been completely emptied, the clam dredge 8 is quickly released and permitted to move sternwise and downwardly while the door or gate 15 is still open, and it is automatically closed and latched when it comes into forcible contact with the water at the stern of the vessel as will be readily understood.

Having thus described my invention, what I claim is:

1. The combination with a marine vessel having a bow-wise inclined ramp mounted adjacent its stern, of a scoop-type dredge for shell fish etc.,
    said dredge comprising a generally rectangular water-pervious cage having a leading open end for scooping-up shell fish etc.,
    a gate mounted at the trailing end of said cage and adapted for free swinging movement about a horizontal axis from a pivotal connection with said cage,
    a pair of substantially spaced and transversely parallel cable receiving blocks attached to said cage adjacent its leading end
    a reciprocable support mounted on said vessel and, disposed beneath said ramp
    said support including a pair of rigidly connected, Y-shaped elements with their diverging members extending sternwise and upwardly inclined with respect to said vessel
    a sheave mounted at the intersection of the, diverging members of each of said rigidly connected Y-shaped elements
    a fluid cylinder mounted on said vessel to extend, fore-and-aft with the outer end of its piston rod operatively connected to said support
    a winch, mounted on said vessel
    a cable having both of its ends secured to said winch
    said cable defining a loop which extends through the cable receiving blocks adjacent the leading end of the aforementioned cage and,
    means mounted on said vessel for guiding the intermediate portions of said cable between said winch and the aforementioned blocks on said cage.

2. The combination of claim 1 wherein the rear gate of the cage of said dredge is provided with a biased latch means; said biased latch means being operable to lock said gate when said dredge is released from said bow-wise inclined ramp and permitted to fall into contact with the water therebelow.

3. The combination of claim 1 wherein the rear gate of the cage of said dredge is provided with a biased latch means; said biased latch means being operable to automatically release said gate as the loaded dredge is pulled up said ramp by said cable and said winch and the contents of the cage permitted to fall from the loaded dredge.

4. The combination of claim 1 wherein the rear gate of the cage of said dredge is provided with a biased latch means; said biased latch means being operable to lock said gate when said dredge is released from said forwardly inclined ramp and permitted to fall into contact with the water therebelow; said biased latch means also being operable to automatically release said gate as the loaded dredge is pulled up said ramp by said cable and said winch and the contents of the cage permitted to fall from the loaded dredge.

5. The combination with a marine vessel having a bow-wise inclined ramp mounted adjacent its stern of a towable scoop-type dredge for shell fish etc.; a winch mounted on said vessel, a cable secured to said winch and to the towable scoop-type dredge, said dredge comprising a generally rectangular water-pervious cage having a leading open end; a rear gate mounted at the trailing end of said cage and adapted for free swinging movement about a horizontal axis from a pivotal connection with said cage; a biased latch for holding said rear gate in closed position; said biased latch being operable to lock the freely swinging gate by impact when said dredge is released from said bow-wise inclined ramp and permitted to fall into contact with the water therebelow.

6. The combination with a marine vessel having a bow-wise inclined ramp mounted adjacent its stern of a towable scoop-type dredge for shell fish etc.; a winch mounted on said vessel, a cable secured to said winch and to the towable scoop-type dredge, said dredge comprising a generally rectangular water-pervious cage having a leading open end; a rear gate mounted at the trailing end of said cage and adapted for free swinging movement about a horizontal axis from a pivotal connection with said cage; a spring-biased latch for holding said rear gate in closed position; said spring biased latch being operable by means mounted on said ramp to automatically release said gate as the loaded dredge is pulled up said ramp by said cable and said winch.

7. The combination with a marine vessel having a bow-wise inclined ramp mounted adjacent its stern of a towable scoop-type dredge for shell fish etc.; a winch mounted on said vessel, a cable secured to said winch and to the towable scoop-type dredge, said dredge comprising a generally rectangular water-pervious cage having a leading open end; a rear gate mounted at the trailing end of said cage and adapted for free swinging movement about a horizontal axis from a pivotal connection with said cage; a spring-biased latch for holding said rear gate in closed position; said spring biased latch being operable by means mounted on said ramp to lock the freely swinging gate by impact when said dredge is released from said bow-wise inclined ramp and permitted to fall into contact with the water therebelow; said spring-biased latch also being operable by means mounted on said ramp to automatically release said rear gate as the loaded dredge is pulled up said ramp by said cable and said winch.

8. The combination with a marine vessel having a longitudinally extending bow-wise inclined ramp mounted adjacent its stern, of a towable scoop-type dredge for shell fish etc., said dredge comprising a generally rectangular water-pervious cage having a leading open end for scooping up shell fish and the like, a rear gate mounted at the trailing end of said cage and adapted for free swinging movement about a horizontal axis from a pivotal connection with said cage and adjacent the upper end of the latter, a pair of substantially spaced and transversely parallel cable receiving blocks attached to said cage adjacent its leading end, cable means contacting said cable-receiving blocks, power means for reeling-in said cable means to thereby move said cage onto said vessel and up said ramp, spring-biased latching means for said gate, means on said ramp to engage and open the spring-biased latching means for the rear gate of said cage, said spring-biased latching means being operable to secure said gate in closed position solely by impact with the water below said ramp when said cage is released from above and permitted to fall by gravity.

9. The combination of claim 8, wherein the cable means constitutes a single cable having both of its ends secured to the power means and defining a loop which extends through the blocks on the dredge.

* * * * *